(No Model.)

F. GUILLEAUME & E. GOLTSTEIN.
JAR CLOSURE.

No. 481,112. Patented Aug. 16, 1892.

Witnesses:
Ewella Dick
L. C. Hills

Inventors:
Franz Guilleaume &
Ewald Goltstein
by Marcellus Bailey atty.

United States Patent Office.

FRANZ GUILLEAUME AND EWALD GOLTSTEIN, OF BONN, GERMANY.

JAR-CLOSURE.

SPECIFICATION forming part of Letters Patent No. 481,112, dated August 16, 1892.

Application filed May 21, 1892. Serial No. 433,872. (No model.)

*To all whom it may concern:*

Be it known that we, FRANZ GUILLEAUME and EWALD GOLTSTEIN, both subjects of the King of Prussia, residing at Bonn, in the Kingdom of Prussia, Germany, have invented new and useful Improvements in Jar-Closures, whereof the following is a specification.

Our invention relates to the securing of jar-lids inserted into the top of the jars and bearing against a shoulder formed inside of the same. According to our improvement the jar is molded in the inside, above the said shoulder, with a number of superposed notches or peripheral grooves, and a resilient cross-bar, somewhat longer than the inside diameter of the jar, is provided for. After the lid has been put in its place, together with an india-rubber tightening-ring, the resilient cross-bar is inserted into the jar while being bent down in the middle, so that its ends engage in the said grooves, and it is pushed down (the ends of the bar slipping during this procedure from one groove to the other) until it presses upon the lid, the bar being then propped in between the walls of the jar and the lid. Preferably the lid is formed with an upwardly-projecting rim for the bar to bear upon. For disengaging the bar it is provided at one end with a ring, whereby it may be drawn out of the groove in which this end is engaged. Instead of a simple cross-bar, a resilient piece having the form of a star with three or more arms may be employed. In case the jar and its contents are boiled after the jar has been closed it is advantageous, for allowing air to escape, to provide the lid with a perforation which is closed after the boiling is finished, the closure requiring, however, to be so arranged that the perforation may easily be opened again for readmitting air and thereby destroying the vacuum in the jar when the lid is to be raised. In view of producing this closure with assistance of the said cross-bar a resilient tongue is attached thereto, adapted to press an india-rubber washer on the perforation.

Figure 1:
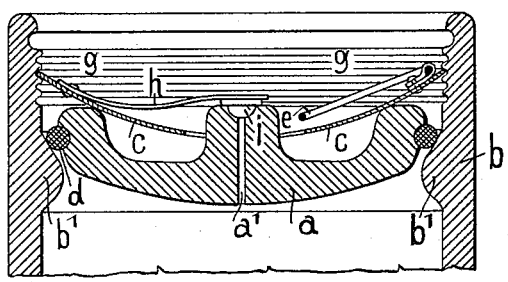
Figure 2:
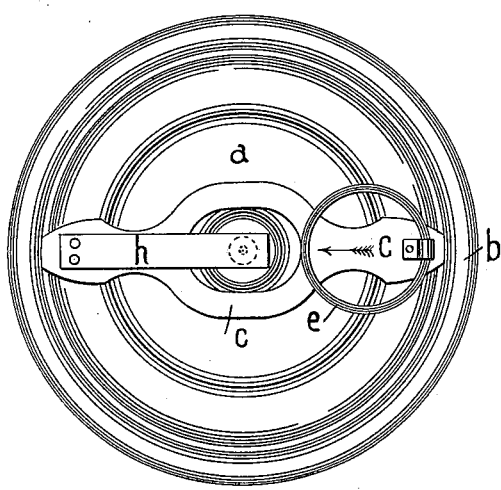
Figure 3:
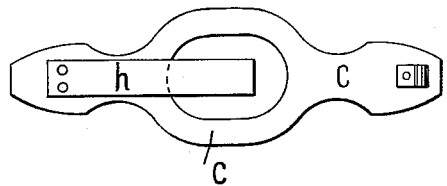

In the annexed drawings, Figure 1 is a sectional elevation of the upper part of a jar provided with the improved closure. Fig. 2 is a top view corresponding thereto, and Fig. 3 a plan of the resilient cross-bar in extended state.

In Figs. 1 and 2, $b$ is the jar, $a$ the lid, and $c$ the resilient cross-bar. The jar is formed inside with the conical shoulder $b'$, on which rests the lid $a$, having an upwardly-projecting rim and provided with the india-rubber tightening-ring $d$, lying in a groove of the lid. The jar has, moreover, the peripheral grooves $g$. The resilient cross-bar $c$, constituted by a normally flat spring, is shown in the position and inflected state in which it appears after it has been pushed down on the projecting rim of the lid, its ends abutting under these conditions against the ridge above the groove in which they are engaged, so that it secures the lid. For disengaging and removing the cross-bar it is provided with the ring $e$.

The aforesaid perforation of the lid (marked in Fig. 1 by the letter $a'$) passes through a knob formed on the lid, and by which the same may be lifted. The perforation is closed by the india-rubber washer $i$, which is held down by the resilient tongue $h$, riveted to the cross-bar $c$. For allowing the cross-bar to pass over the knob it is formed with a hole in the middle.

We claim as our invention—

1. A jar-closure consisting in the combination, with a jar having inside a peripheral shoulder and above the same a number of superposed grooves, of a lid resting on said shoulder and a resilient cross-bar longer than the inner diameter of the jar and which on being bent down in the middle and forced into the jar engages with its ends in the said grooves and ultimately presses upon the lid, substantially as described.

2. A jar-closure consisting in the combination, with a jar having inside a peripheral shoulder and above the same a number of superposed grooves, of a lid resting on said shoulder and provided with a perforation, a resilient cross-bar longer than the inner diameter of the jar and which on being bent down in the middle and forced into the jar engages with its ends in the said grooves and ultimately presses upon the lid, the said cross-bar carrying a resilient tongue adapted to press on the perforation of the lid, and an india-rubber washer placed between the tongue and the perforation, substantially as specified.

In testimony whereof we have hereunto set our hands in the presence of two subscribing witnesses.

FRANZ GUILLEAUME.
EWALD GOLTSTEIN.

Witnesses:
  H. A. MAXWELL,
  SIBILLA LANG.